United States Patent [19]
Abthoff et al.

[11] Patent Number: 4,775,518
[45] Date of Patent: Oct. 4, 1988

[54] EXHAUST GAS CATALYTIC CONVERTER ARRANGEMENT

[75] Inventors: Jörg Abthoff, Plüderhausen; Hans-Dieter Schuster, Schorndorf; Hans-Joachim Langer, Remseck; Klaus B. Kubatschka, Reichenbach; Günther Ebinger, Heiningen, all of Fed. Rep. of Germany

[73] Assignee: Daimler-Benz Aktiengesellschaft, Stuttgart, Fed. Rep. of Germany

[21] Appl. No.: 884,558

[22] Filed: Jul. 11, 1986

[30] Foreign Application Priority Data

Jul. 11, 1985 [DE] Fed. Rep. of Germany ....... 3524775

[51] Int. Cl.⁴ .............................................. F01N 3/20
[52] U.S. Cl. ................................. 422/179; 422/177; 422/180; 422/181; 422/221; 422/222
[58] Field of Search ............... 422/177, 179, 180, 181, 422/221, 222

[56] References Cited

U.S. PATENT DOCUMENTS

| | | | |
|---|---|---|---|
| 3,189,653 | 6/1965 | Hauel | 422/177 |
| 3,817,716 | 6/1974 | Betz | 422/181 |
| 3,961,907 | 6/1976 | Close et al. | 422/179 |
| 3,966,443 | 6/1976 | Okano et al. | 422/177 |
| 4,269,807 | 5/1981 | Bailey et al. | 422/180 |
| 4,279,864 | 7/1981 | Nara et al. | 422/180 |
| 4,350,664 | 9/1982 | Gaysert | 422/180 |

FOREIGN PATENT DOCUMENTS 3514150 10/1986 Netherlands ................. 422/180

Primary Examiner—David L. Lacey
Assistant Examiner—Lori-Ann Johnson
Attorney, Agent, or Firm—Barnes & Thornburg

[57] ABSTRACT

A monolithic exhaust gas catalyst, or catalytic converter, is arranged in a metallic housing and is supported against the inner surfaces of the housing by a resilient fiber material positioned therebetween. The resilient fiber material is provided with a catalytically active coating so that the exhaust gases which flow outside the exhaust gas catalyst and through the fiber material, are also converted by the treated fiber material.

6 Claims, 1 Drawing Sheet

U.S. Patent  Oct. 4, 1988  4,775,518
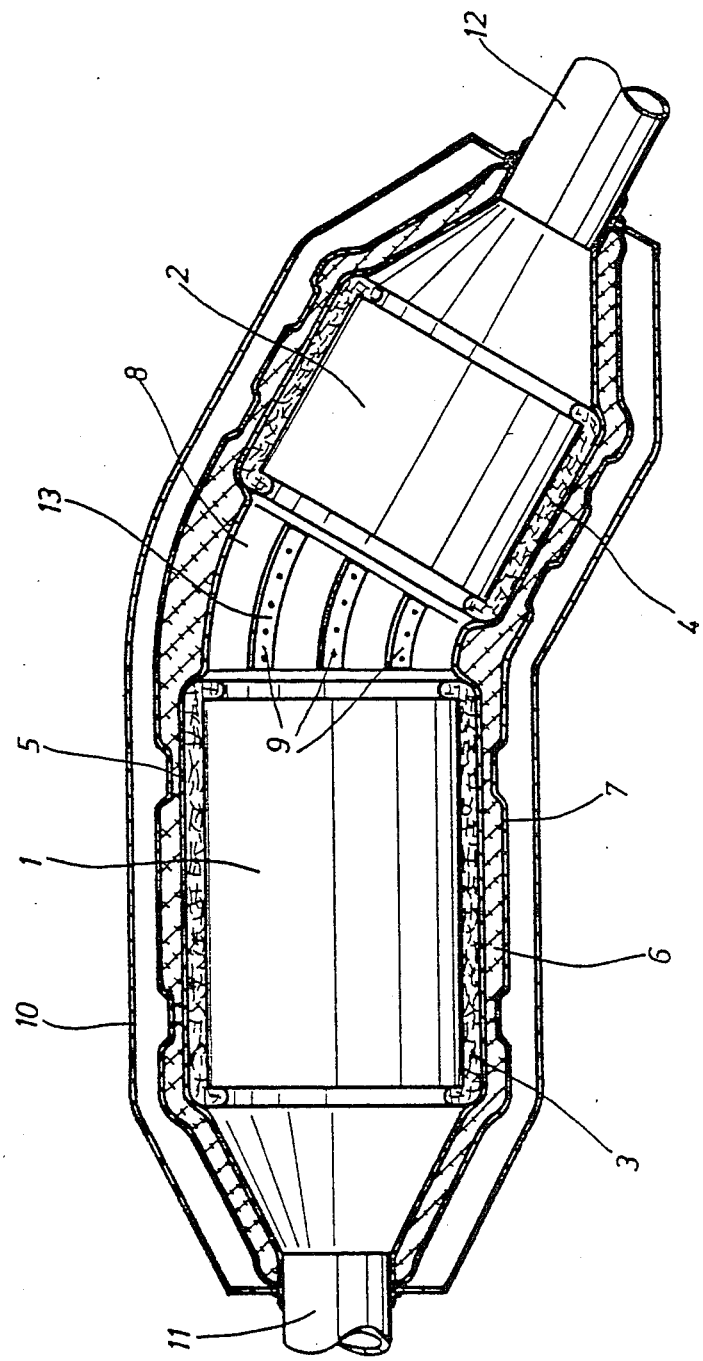

EXHAUST GAS CATALYTIC CONVERTER ARRANGEMENT

BACKGROUND AND SUMMARY OF THE INVENTION

The invention relates to a monolithic exhaust gas catalyst, or catalytic converter, which is arranged in a metallic housing and is flexibly supported against the inner surfaces of the housing by means of a resilient fiber material.

Known exhaust gas catalysts generally consist of a monolithic carrier which has a honeycomb-like structure and is provided with a catalytically active coating. The exhaust gas flows through the channels formed by the honeycomb and is thereby catalytically converted. Because both the metal housing and the exhaust gas catalyst are exposed to high temperatures, and are thus subject to thermal expansion, fixing the exhaust gas catalyst in the housing is not entirely simple. To compensate for the variable thermal expansions, a layer of resilient fiber material is usually arranged between the catalyst block and the housing. The fiber material accommodates the different thermal expansions and at the same time protects the catalyst block from the effects of shock, as described in, for example, German Unexamined Published Application (Offenlegungsschrift) No. 2,935,470.

It has been found that, in spite of the fact that sealing of the intermediate space between the exhaust gas catalyst block and the metallic housing has been constantly improved, with increasing operating time exhaust gas flows past the catalyst and through the layer of the resilient fiber material, thereby increasing the content of unconverted compounds in the exhaust of the vehicle.

It is thus an object of the invention to prevent, to the extent possible, the passage of untreated exhaust gases from the exhaust gas stream upstream of the catalyst into the exhaust gas stream downstream of the catalyst.

This object is achieved by providing the resilient fiber supporting the monolitic exhaust gas catalyst with a catalytically active coating.

The resilient fiber material generally employed is a coil of woven wire cloth, knitted wire cloth or a moulding produced from a network-like metal structure consisting of thin wires or of a metal felt. Furthermore, in order to obtain better thermal insulation, the resilient fiber material can be mixed with an inorganic fiber material, such as asbestos, or the said inorganic fiber material can run through the resilient fiber material (as disclosed in German Unexamined Published Application No. 2,935,470 or German Unexamined Published Application No. 2,920,604).

According to an embodiment of the invention, the fiber material is provided with a catalytically active coating by which the exhaust gases entering the fiber material are converted. The catalytically active coating can be applied onto the fiber material by the generally customary methods. The catalytically active substances used are the substances which are also employed in the catalyst element, for example the noble metals of the platinum group.

Because of the very low flow velocity of the exhaust gases through the resilient fiber material, very good chemical conversion of the exhaust gas takes place even at the lower temperatures close to the housing.

Other objects, advantages and novel features of the present invention will become apparent from the following detailed description of the invention when considered in conjunction with the accompanying drawings.

BRIEF DESCRIPTION OF THE DRAWINGS

The single figure shows a catalyst housing containing two exhaust gas catalyst blocks.

DETAILED DESCRIPTION OF THE DRAWING

The two monolithic catalyst blocks 1 and 2 are fixed in the housing 5 in a conventional matter with insertion of the resilient steel wool layers 3 and 4, which accommodate the thermal expansion of the arrangement. The steel wool layers 3 and 4 are provided with a catalytically active platinum coating which is produced by impregnation of the steel wool layer with 1 to 2% strength platinum chloride solution and ignition. The exhaust gas is fed to the catalyst blocks and removed from them via the exhaust pipes 11 and 12, respectively. The housing 5 is also provided with a thermal insulation 6 which is covered on the outside by a metal shell 7. According to one preferred embodiment of the invention, an outer shell 10 can be used in addition. Between the two catalyst blocks 1 and 2, the housing is bent through an angle in region 8 and is provided with deflector plates 9, which are connected to the housing by their angled base 13. Because of the catalytic coating, the exhaust gas passing by the outside of the catalyst blocks 1 and 2 and through the resilient steel wool layer is also coverted.

The path followed to date in developing catalysts of this type consisted in sealing the resilient fiber material more and more effectively in order to prevent the passage of gases. However, because of exposure to great heat and the large temperature fluctuations, this seal was always inadequate and not durable. With the present invention, this line of development was departed from in that the exhaust gas which unavoidably passes through the resilient fiber material is catalytically converted. Thus, constant exhaust gas characteristics can be expected even after a relatively long operating time.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. An exhaust gas catalytic converter arrangement comprising:
   housing means;
   monolithic gas catalyst means,
   resilient fiber means interposed in an intermediate space between the housing means and the monolithic gas catalyst means for resiliently sealing and supporting the monolithic gas catalyst means in the housing means in an exhaust gas flow path, and
   catalytically active coating means on the resilient fiber means for catalytically treating exhaust gases which leak into the intermediate space.

2. A catalytic converter arrangement according to claim 1, wherein said housing means is a metallic housing.

3. A catalytic converter arrangement according to claim 1, wherein the catalytically active coating means is a platinum coating comprising 1 to 2 percent strength platinum chloride solution.

4. A catalytic converter arrangement according to claim 1, wherein a thermal insulation surrounds the housing.

5. A catalytic converter arrangement according to claim 4, wherein a metal shell surrounds the thermal insulation.

6. A catalytic converter arrangement according to claim 5, wherein the catalytically active coating means is a platinum coating comprising 1 to 2 percent strength platinum chloride solution.

* * * * *